United States Patent [19]

Driscoll, III et al.

[11] Patent Number: 6,044,405
[45] Date of Patent: *Mar. 28, 2000

[54] SERVICE NETWORK INCORPORATING GEOGRAPHICALLY-REMOTE HUBS LINKED BY HIGH SPEED TRANSMISSION PATHS

[75] Inventors: Edward J. Driscoll, III, Chaska; Allen L. Witters, Eden Prairie; Gene A. Kath, Falcon Heights, all of Minn.; Richard A. Petersen, Hudson, Wis.

[73] Assignee: WAM!NET Inc., Eagan, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/631,540

[22] Filed: Apr. 12, 1996

[51] Int. Cl.$^7$ .................................................. G06F 13/00
[52] U.S. Cl. ...................... 709/232; 709/238; 364/479.01
[58] Field of Search .......................... 395/800.04, 200.68, 395/200.69, 200.7, 200.77, 800.01, 200.33, 206.68; 364/DIG. 1, 479.01, 479.02, 479.03, 479.04; 379/93.24; 370/407, 428, 465; 709/206, 238, 232

[56] References Cited

U.S. PATENT DOCUMENTS

| | | | |
|---|---|---|---|
| 4,902,881 | 2/1990 | Janku | 235/381 |
| 5,144,622 | 9/1992 | Takiyasu et al. | 370/85.13 |
| 5,406,557 | 4/1995 | Baudoin | 370/61 |
| 5,438,660 | 8/1995 | Lee et al. | 395/155 |
| 5,450,395 | 9/1995 | Hostter et al. | 370/18 |
| 5,508,817 | 4/1996 | Kunigami | 358/402 |
| 5,627,829 | 5/1997 | Gleeson et al. | 370/230 |
| 5,805,811 | 9/1998 | Pratt et al. | 395/200.36 |

FOREIGN PATENT DOCUMENTS

| | | | |
|---|---|---|---|
| 0 395 428 A2 | 10/1990 | European Pat. Off. | 12/48 |
| 0 614 291 A1 | 9/1994 | European Pat. Off. | 10/20 |

OTHER PUBLICATIONS

Patent Abstracts of Japan; Inventor: Kunigami Toshio; Title: Charging System for Electronic Mail.

Usage–Based Pricing of Packet Data Generated by a Heterogeneous User Population; Author: Michael L. Honig and Kenneth Steiglitz.

*Primary Examiner*—John A. Follansbee
*Assistant Examiner*—Dzung C. Nguyen
*Attorney, Agent, or Firm*—Larkin, Hoffman, Daly & Lindgren, Ltd.; Frederick W. Niebuhr

[57] ABSTRACT

The method for electronically conveying large blocks of data between geographically-remote locations by uploading the sender's data to the local hub site of a service provider's network, earmarking that data with an electronic invoice, transmitting that data via the service provider's high speed network to a secondary hub site that is local to the recipient's geographic location, and downloading the data from the second hub site to the recipient's network. Duplicate archival versions of the transmitted data may be maintained at two geographically-distinct locations, such as the service provider's primary and secondary network hub sites. The total number of network connections may be reduced with a minimum number of alternative connections maintained to ensure data delivery in the event of a network connection failure. Value-added services may be performed on the data either prior or subsequent to its transmission between the primary and secondary hub sites.

41 Claims, 5 Drawing Sheets

SERVICE NETWORK INCORPORATING GEOGRAPHICALLY-REMOTE HUBS LINKED BY HIGH SPEED TRANSMISSION PATHS

FIELD OF THE INVENTION

The present invention relates generally to computer-based data transmission networks, and particularly to a method by which a provider-operated data shipping service may transmit large data blocks for customers at high speeds between geographically remote locations.

BACKGROUND OF THE INVENTION

The transmission of large data files (typically those in the megabyte and greater size range) or large quantities of smaller data blocks between two remote locations has traditionally been accomplished in one of three ways: (1) physically transporting the data on a tangible media such a magnetic tape, floppy or floptical disks, or optical discs (referred to as a "sneaker net"), (2) electronic transmission via modem and public telecommunications lines, or (3) transmission in the electronic domain via a dedicated transmission pathway consisting of one or more hard wire, fiber optic, microwave, or satellite linkages.

The need to send huge data files between remote locations has continued to expand in many industries, such as photographic and pre-press operations, magazine and catalog printing, medical imaging, CAD/CAM fabrication and manufacturing, financial and accounting services, and many scientific and technical research operations.

Physical transportation of data is restricted by the size of large data files and the capacity of transportable media. Floppy and floptical disk media is currently a preferred avenue due to the relatively small cost of the media per megabyte of storage capacity. Conventional high-density floppy disks having approximately 1.44 megabytes of formatted uncompressed capacity have been replaced by various high-capacity options such as the 100 megabyte Iomega® ZIP™ or Syquest® drives, and the recently introduced 120 megabyte LS-120™ floppy disk from 3M Company that is backwards compatible with the prevailing 1.44 megabyte formats. Even greater capacity may be obtained using magneto-optical disks such as the 230 megabyte DynaMO® format from Fujitsu, WORM and rewritable optical discs such as the industry-standard 650 megabyte CD-ROMs, and various removable hard drives.

However, even with increasing storage capacity and lowered equipment prices, physical transportation of data has many inherent drawbacks. Besides the cost of media, there are additional monetary costs for the actual physical transportation, including packaging, postal, messenger, or courier charges, and the time and expense involved with having personnel download, address, deliver, receive, and subsequently load the data. If the data is processed at the remote location and returned, the costs are doubled.

Utilizing overnight or same-day couriers, a round-trip shipment between two geographically remote locations (i.e., beyond the boundary of a single metropolitan region) will still require one or two days in transit.

Finally, there are the inherent risks of data loss or corruption due to defective media, mishandling, environmental conditions, and routing errors. Attempting to prevent such problems requires protective packaging, redundant shipments, and other safeguards that are expensive, time consuming, and yet unreliable. Even with safeguards in place, lost media or corrupted data can result in days of lost time in transit, as well as consuming valuable personnel time and creating uncertainty regarding the status of a given project or operation.

A variety of electronic data transmission systems exist for transmitting data files between two spatially-distinct locations. Local-area networks (LANs) are generally regarded as optimal for connecting a plurality of personal computers together within a single facility or campus using a file server or mainframe system as the backbone, and some LANs use dedicated transmission pathways to extend beyond a defined facility's or campus' geographical boundaries. Wide-area networks (WANs) are generally utilized for connections between more distant locations, and may be used to interconnect separate LANs. In the case of both LANs and WANs, there is usually a network connection between local computers using low speed hard wired or infrared pathways, and dedicated high speed connections between distant locations or with shared peripherals and systems maintenance devices.

While dedicated LANs or WANs will serve the needs for data transmission within a homogeneous autonomous enterprise—such as a single company having several plants or a university with more than one campus—they have proven unsuitable for conveying data between heterogeneous enterprises such as service providers and their customers.

Data transmission via conventional multiplexed telecommunications pathways is too slow to be useful for large data files even when compressed. Data errors, verification schemes, and encryption protocols all complicate such systems. Shared public networks are similarly too slow and unwieldy for sustained use in most industries requiring rapid shipping of large and complex data files, particularly where security and data integrity are primary concerns.

Private WANs are one feasible solution, but are frequently too expensive given the moderate transmission volumes that many companies require. In addition, one company may require frequent transmission connections to a plurality of unrelated senders or recipients at remote sites each having a different LAN structure and protocol, as well as infrequent or "one time" nonrecurring transmission connections to many other unrelated sites.

The use of commercial WANs can sometimes overcome these problems for companies having high volume or recurring transmission needs with unrelated sites, but these can be quite complex and expensive, requiring on-premises equipment, leased transmission pathways, technical support, maintenance, and custom-developed software applications.

SUMMARY OF THE INVENTION

The method of this invention permits electronically conveying large blocks of data between geographically-remote locations by uploading the sender's data to the local hub site of a service provider's network, earmarking that data with an electronic invoice, transmitting that data via the service provider's high speed network to a secondary hub site that is local to the recipient's geographic location, and downloading the data from the second hub site to the recipient's network.

The data is earmarked so that the service provider can track the data files and charge the sender or recipient at a standardized rate determined by any one or more of several factors, such as the size of the data block or additional value-added services performed on the data such as proofing, archiving, encryption, or compression. Duplicate archival versions of the transmitted data may be maintained at two geographically-distinct locations—such as the service provider's primary and secondary network hub sites—to prevent the need for recreation or retransmission in the event of data loss or corruption by either the sender, recipient, or service provider.

The service provider's network may extend between the plurality of geographically-remote hub sites in a daisy-chain, closed loop, or other hybrid configurations (compared with wheel-and-spoke configurations used for conventional overnight package delivery services). The total number of network connections may be reduced, and yet a minimum number of alternative connections maintained to ensure data delivery in the event of a network connection failure. Accounting and tracking functions may be performed at the individual hub sites, or the electronic invoices may be transmitted to and processed at a separate data management center.

The network interfaces virtually transparently with the senders' and recipients' networks—using dedicated linking modules and object-oriented programs compatible with existing graphical user interfaces (GUIs)—while not directly interacting with those client networks.

DETAILED DESCRIPTION OF THE PREFERRED EMBODIMENTS

Figure 1:
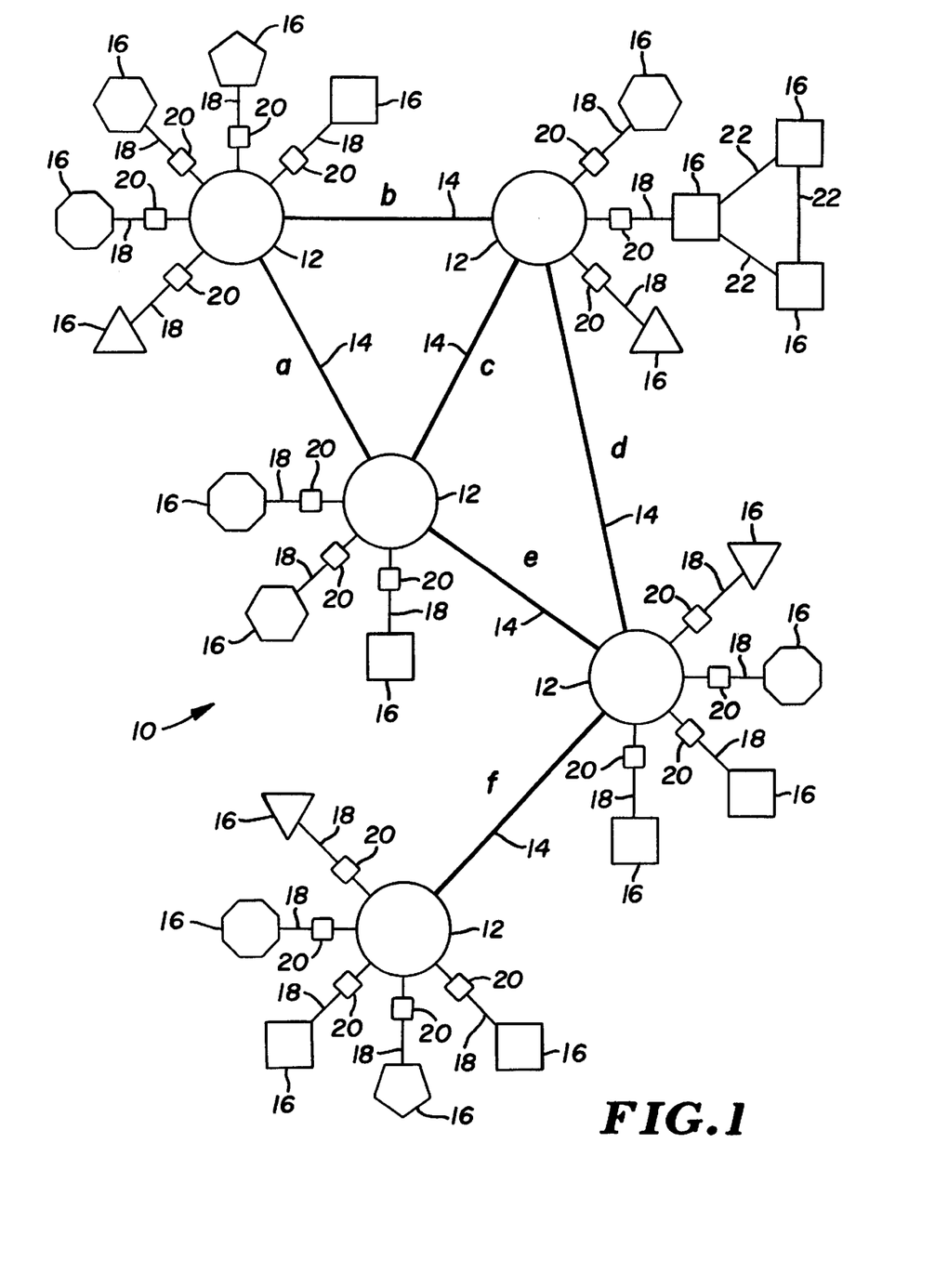
FIG. 1 is a diagrammatic view of a hybrid configuration for the network of this invention utilized by the service provider for conveying documents between senders and recipients using the method of this invention.

Referring particularly to FIG. 1, a network 10 is shown composed of a plurality of network hubs 12 spaced apart geographically in a plurality of spatially remote locations, such as distinct cities, metropolitan regions, states, countries, or the like. Each network hub 12 is connected to at least one other network hub 12 via a high speed digital, analog, or hybrid electronic transmission pathway 14, referred to herein as a network connection 14. The various network connections 14 are designated a, b, c, d, e, and, with connection a extending between the primary and secondary network hubs 12, connection b extending between the primary and tertiary network hubs 12, connection c extending between the tertiary and secondary network hubs 12, and connections d, e, and f tying in a plurality of additional network hubs 12.

Connected to each network hub is a plurality of senders or recipients 16 who are each located generally more geographically proximate to a corresponding one of the network hub 12 locations, and each sender or recipient 16 has a computer system linked via a dedicated electronic transmission pathway 18 and network access device 20 to that corresponding network hub 12.

Senders and recipients 16 may constitute separate or related businesses, individuals, institutions, or other entities. In FIG. 1, senders or recipients 16 which are like or related entities are shown using common geometric designs, including triangles, squares, pentagons, hexagons, and octagons. A sender or recipient 16 designated by the triangle connected to the primary network hub 12 would therefore be related in some subjective manner to a sender or recipient 16 designated by the triangle connected to the secondary and additional network hubs 12. Each such sender or recipient 16 might be a regional office of one corporation, a parent and subsidiary, branches of a financial institution, governmental offices, university campuses, and so forth.

A variety of distinct operational configurations may therefore be readily appreciated. For example, senders and recipients 16 designated by a hexagonal shape are connected together along a closed loop formed by network connections 14 labeled a, b, and c between the primary, secondary, and tertiary network hubs. No such sender or recipient 16 is connected to one of the additional network hubs 12 outside that closed loop. Senders and recipients 16 designated with a triangle are connected together by network hubs 12 and network connections 14 only along pathway b—d—f whereas senders and recipients 16 designated with an octagon are connected together by network hubs 12 and network connections 14 only along pathway a—e—f, with closed loops only being formed by including intermediate network hubs 12 to which no like or related sender or recipient 16 is connected. Related senders and recipients 16 may be connected to network hubs 12 separated by one of more intermediate network hubs 12 having no related senders or recipients 16, such as in the case of the senders or recipients 16 designated by a pentagon, or they may be connected at every network hub 12 such as the senders or recipients 16 designated by a square. In addition, referring to the common senders and recipients 16 designated by a square connected to the tertiary network hub 12, a plurality of separate sender or recipient 16 locations or facilities may be interconnected via a local area network 22 having one or more connections to a network hub 12, in this case the tertiary network hub 12 as noted.

Senders 16 are therefore capable of conveying documents in the electronic domain to any potential recipient operatively connected to the network 12, via either a direct connection to a network hub 12, or an indirect connection to a network hub 12 through a related sender or recipient 16.

In this manner, a shortest physical path between any two senders and recipients 16 will be formed, and as the number of network hubs 12 and network connections increases, the number of alternate pathways between each potential pair of senders and recipients 16 also increases. These alternate pathways may be physically longer than the shortest path connections, which may therefore be more expensive to construct and maintain on an incremental cost level, however this physical variance will be negligible for purposes of electronic transmission of documents. While direct network connections 14 between every network hub 12 could be established, it may be readily appreciated that the number of actual network connections 14 can be minimized so that each network hub 12 is connected to each other network hub 12 by a shortest path and one alternate path, thereby ensuring that transmissions to or from a given network hub 12 will not be interrupted due to failures in one of the corresponding network connections 14 to that network hub 12.

It is also understood that the various alternate paths established between two network hubs 12 permit electronic domain duplicates of a document to be transmitted simultaneously (or nearly simultaneously) to separate network hubs 12 and conveyed to distinct recipients 16, or conveyed at completely different times to distinct network hubs 12 and recipients 16, depending selectively upon the relative urgency of the transmission and the volume of document "traffic" on the affected network connections 14 within the network 10. A single document may therefore be divided into separate and distinct subdocuments and transmitted via two different paths and recombined at the network hub 12 from which the document will be transported directly to the recipient 16, for example a first subdocument transmitted from the primary to the secondary network hubs 12, and a separate subdocument transmitted from the primary to the tertiary to the secondary network hubs 12, and reassembled into the document at the secondary network hub 12.

Therefore, for purposes of this description, the term "document" may functionally include a single data file, a batch of separate data files, or a plurality of data blocks that are appended to one another to form a composite data file.

The data shipping network 10 of this invention is preferably operated by a "service provider" responsible in whole or in part for activities such as the development, installation, support, and maintenance of the components of the network 10, network hubs 12, network connections 14, and network access devices 20. The plurality of senders or recipients 16 may thus each be considered as "clients" or "customers" of the service provider.

The operative components of the network 10 located at each network hub 12 will include at least one central processing unit or processor array carried on a mainframe or file server architecture, an access control module connected to the central processing unit, one or more wide area network (WAN) routers for managing data flow between distributed nodes on the network and the various network connections 14, channel and data service units, power supply, user interfaces (such as personal computers or terminals), and a variety of peripheral devices including floppy, floptical, magneto-optical, and optical disc input/output, optical, RAID, or other mass storage devices, high resolution printers or plotters, scanners or other digitizing devices such as CCD video cameras, modems, and dedicated RISC processors for performing encryption, compression, color proofing, integrity verification, indexing, file comparison, or data string searching.

The network access module will normally include both hardware and software components designed to limit unauthorized access to the network 10 and control communications with the service provider or along the network connections 14, as well as monitor transmission parameters and detect characteristic attributes associated with each document being conveyed over the network 10 and each sender or recipient 16 connection with the network 10. The network access module will be operatively linked with a transaction control module and an information database, which together process and retain data regarding the status and tracking of documents conveyed, compute charges for the transmissions and other value added services provided, and perform processing functions dictated by the service provider. A portion of the access control module, transaction control module, and information database may be generated or retained on (or loaded onto) the computer system operated by the sender or recipient 16 as one or more software routines or hardware interfaces.

Various aspects of the software and hardware configurations will be evident from a description of the preferred method of operation discussed in detail below, however those of ordinary skill in the art of designing, operating, and maintaining wide area networks, database management systems, and transaction-based network communication systems may develop a widely divergent range of embodiments which function suitably and meet specific performance requirements depending upon the intended applications for the network 10, design and budgetary constraints, intra-industry standards and protocols, user preferences, regulatory requirements, and the availability and future development of hardware and software technology.

For example, the network connections 14 may include fiber optic, microwave, satellite, or other high bandwidth communications pathways capable of relatively high speed data transmission. The electronic transmission pathways connecting the individual sender or recipient 16 with the corresponding network hub 12 will depend on the volume of transmissions being processed, the available time for transporting the documents to the network hub 12, and the transmission rate of that pathway 18. The pathway 18 may vary from site to site, and could include a variety of known formats including a dedicated T1 or T3 connection, ISDN, fiber optic line, microwave telecommunications linkage, switched wire line, Internet, or even a modem and public telephone line. In some cases, the electronic transmission pathways connecting the individual sender or recipient 16 with the corresponding network hub 12 may operate at a substantially slower transmission rate than the network connections 14 between the network hubs 12, however the relatively short physical distance between the sender or recipient 16 and the corresponding network hub 12 permits the sender or recipient to invest in a relatively high speed transmission pathway 18 format which might not otherwise be financially or logistically practical if the sender 16 were establishing direct connections to one or more geographically remote recipients 16.

Figure 2:
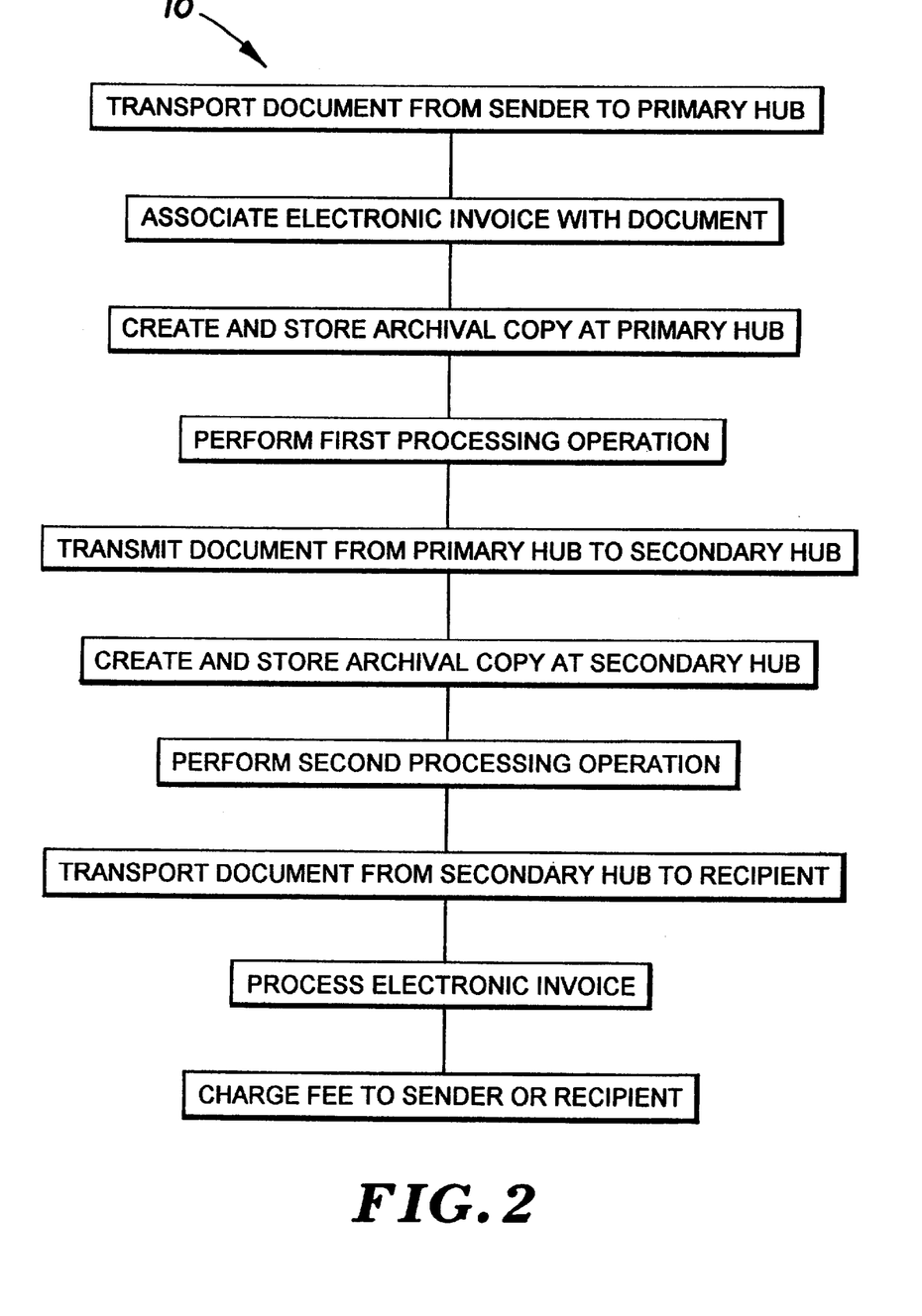
FIG. 2 is a flowchart showing the basic operational steps for conveying documents between senders and recipients using the method of this invention.

Referring particularly to FIG. 2, the basic operational steps involved with conveying a document from a sender 16 to a recipient 16 using the network 10 are described. It is understood that various of these operational steps may be performed in different or nonsequential orders, may be broken into subroutines and performed by different components of the network 10, may include steps performed manually by operators or individuals as well as those automatically performed according to predetermined program instructions, and may include additional or optional steps. As such, the various steps of the method of this invention as described and claimed are believed to be representative of the overall process, and not a sequential formulation for achieving the desired result of conveying the document between the sender 16 and intended recipient 16.

The document is initially created by or for the sender 16 on a computer system or network located at the sender's 16 facility, or is loaded onto that system using any convention I/O means for reading or digitizing data. The document is then transported to the primary network hub 12, either via the electronic transmission pathways connecting the sender 16 with the corresponding network hub 12, or by physical transportation of tangible media containing the document.

An electronic invoice is created and linked operationally to the document. The electronic invoice may originate with software provided by the service provider for operation on the sender's 16 computer system, or may be generated by interaction with the network interface device 20 or network hub 12. The electronic invoice may be appended to the document as a part of the data file, as a separate by linked data file, or through the use of a common reference. The electronic invoice will include at least two data elements, one being a unique identification indicia for the document, and the other being at least one characteristic attribute associated with the document or its transmission that is (or is subsequently) related to a rate for conveying the document from the sender 16 to the recipient 16.

The identification indicia and characteristic attribute may be distinct data element, or they may be combined into a single data elements which the network access module, transaction module, information database, and document tracking system is capable of distinguishing and decoding for later processing. The identification indicia may also include information regarding the sender 16 or recipient 16 identity, routing or transmission instructions, value added service requests, confirmation or retransmission instructions, batch processing instructions, partitioning or data block structure information, network access authorization information, and security or data verification criteria. The characteristic attribute may be or relate generally to the digital file size of the document in megabytes, the requested network priority or transmission rate, the time of day transported to the primary network hub 12 or transmitted to the secondary network hub 12, the digital bit depth or analog content of the document, value added services to be provided in relation to the document, the nature or status of the intended recipient 16, or any other suitable criteria wholly or partially determinative of the fee which the sender 16 or recipient 16 is charged for conveying or processing the document.

A duplicate of the document is created at the primary network hub 12 and stored in an archival storage system for future reference, security, verification, or retransmission purposes.

A first processing operation may also be performed on the document (or a portion thereof) at the primary network hub, including encryption, compression, screening or error detection, or any variety of value-added services such as color proofing or color separation of graphic images, creation of tangible or electronic domain comps, video and audio sequencing, copyright royalty calculations for electronic publishing, and so forth. Any number of such processing operations may be performed depending upon the cost and time constraints imposed.

The document is then routed for electronic transmission via the appropriate network connections 14. A preformatted route may be assigned for specific sender-recipient 16 transmissions, or the network 10 may calculate the most efficient route for a given document based upon its size, complexity, processing requirements, network traffic, and the operational status of each network hub 12 and network connection 14. The document is then transmitted as routed from the primary network hub to the secondary network hub.

Any second processing steps that may be required are then performed at the secondary network hub 12, such as decompression or decryption of the data. In addition, value-added services which might otherwise have been performed as "first" processing operations may be conducted, such as color proofing or color separations of graphic images. These value-added services may be performed at the secondary network hub 12 either because the operations should be performed subsequent to transmission to ensure data integrity, or due to more available or efficient processing capabilities compared with those of the primary network hub 12.

The document is then transported from the secondary network hub 12 to the recipient 16 using the same means described above in relation to transporting the document from the sender 16 to the primary processing hub 12.

The electronic invoice is processed to calculate a fee to be charged for the transmission or value-added services, with that fee calculated at least in part based upon one or more characteristic attributes associated with the document, its transmission, or the sender or recipient 16 (which are equally considered characteristic attributes of that document as well.) A fee may be charged to either the sender or recipient 16 or both, either prior to or after the successful transmission or receipt of the document. The sender or recipient may maintain accounts with the service provider against which fees are debited, or the service provider may be authorized to conduct an electronic fund transfer to obtain that fee on a periodic or document-by-document basis. The service provider may compile several fees for transmissions into a single charge, and receive payment or bill the sender or recipient 16 in any conventional manner. It may thus be appreciated that the steps of processing the electronic invoice and charging a fee for the transmission or value-added services may be conducted in whole or in part before, after, or during the transmission of the document, at one or both of the primary or secondary network hubs 12, at a remote data management facility operated by the service provider, or on the sender's or recipient's 16 own computer system utilizing a software program and database information provided by the service provider.

Figure 3:
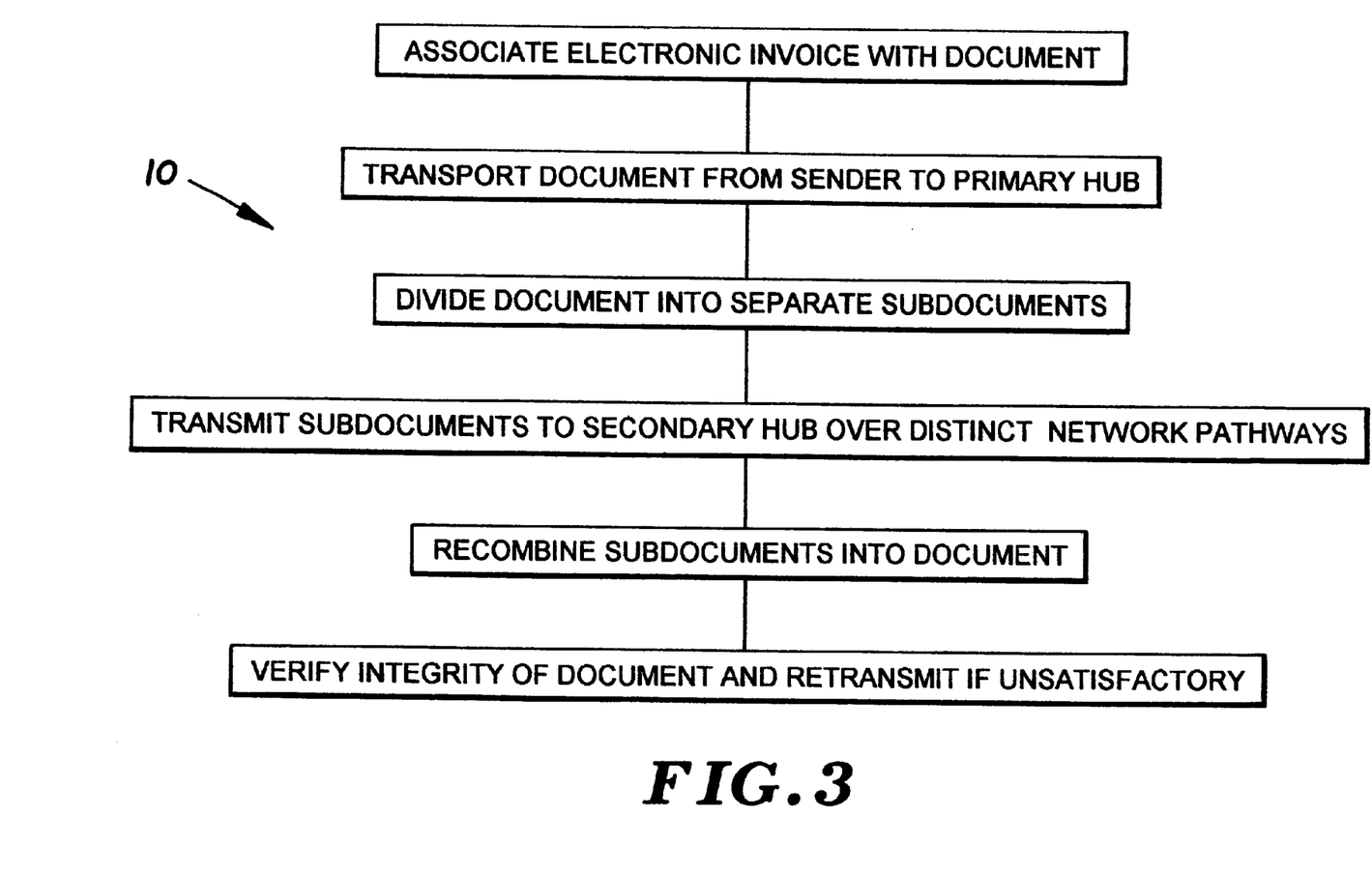
FIG. 3 is a flowchart showing alternate operation steps for processing and conveying documents between senders and recipients using the method of this invention.

Referring to FIG. 3, several variations or options in the steps described above are shown, for example associating the electronic invoice with the document prior to the sender's transporting it to the primary network hub 12, dividing the document into subdocuments for parallel transmission over the same or separate network connections 14, transmitting different subdocuments to the secondary network hub 12 over distinct pathways involving separate network connections 14, recombining or reconstituting the subdocuments into the original document at the secondary network hub 12, verifying the integrity of the document for corruption relative to a predetermined qualitative or quantitative standard or threshold, and retransmitting the document if the verification process yields an unsatisfactory or unacceptable result or other criteria warrant retransmission.

Referring particularly to FIGS. 4–8, the operational steps for conveying a document from a sender 16 to an intended recipient 16 are described in greater detail from the visual perspective of a given sender 16 using a computer system having a graphic user interface (GUI) shown diagrammatically in FIGS. 4–8. This GUI is intended as a representative example only, and contains elements and depictions in common with or similar to other commercially-available GUIs, including Windows 95™ marketed by MicroSoft Corporation, and Mac-OS marketed by Apple Computer, Inc. Those skilled in the art of designing and coding software programs and GUIs will readily appreciate the representative nature of these depictions as they pertain to the two specific GUIs identified above, as well as other known GUIs and broader object-oriented programming systems (OOPS).

Figure 4:
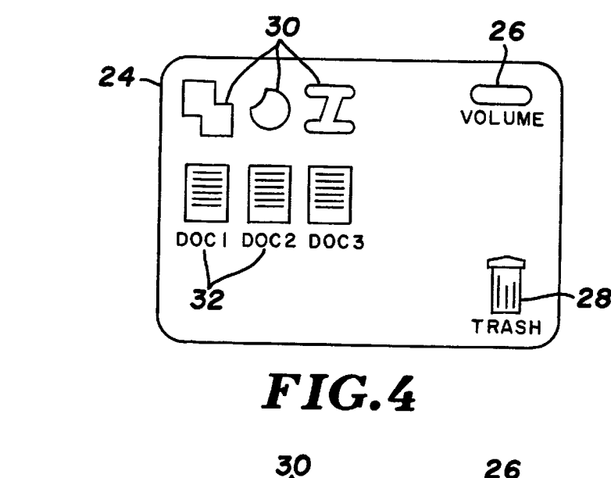
FIG. 4 is a diagrammatic depiction of a representative example of a conventional graphical user interface (GUI) as seen from a hypothetical sender's viewpoint on that sender's computer system.

Referring to FIG. 4, the boundaries of a monitor screen 24 or virtual "desktop" are shown on which are displayed various graphical elements relating to software or hardware components of the sender's 16 computer system, including a hard drive 26 containing the operating system for the computer and bearing a particular volume name, a functional icon 28 such as a "trash can" which performs a specific operation when actuated (retaining and deleting a deposited file in the case of the trash can 28), a plurality of program icons 30 each relating to a software program resident on or available to the operating system, and a plurality of document icons 32 relating to digital data files contained in the system memory or stored on the hard disk.

Figure 5:
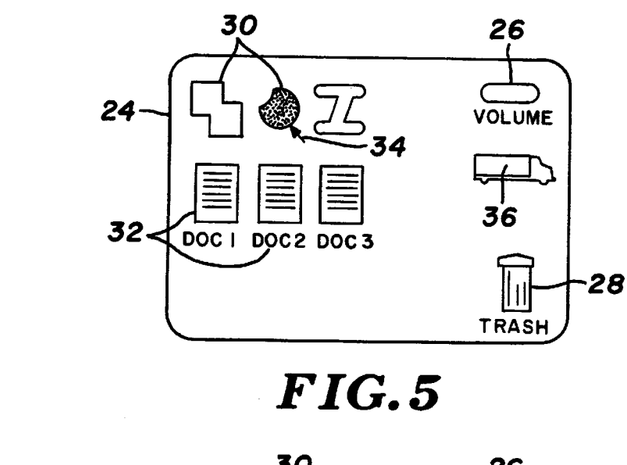
FIG. 5 is a diagrammatic depiction of the GUI of FIG. 4 wherein a program icon has been selected by the user and an additional screen icon created.

In FIG. 5, the sender 16 has used a pointing device 34 such as a mouse- or touchpad-driven cursor to "highlight" and select a desired program icon 30 (in this case the software program corresponding to and responsible for establishing a communications connection with the service provider's network 10) and actuated the pointing device or other command so as to launch the program within the operating system. As a result of that program being launched, a separate display icon 36 is created at a predetermined location on the desktop 24, which may then be selectively moved or repositioned to any desired location on the desktop, hidden, reduced, or otherwise reconfigured. In other types of GUIs, a menu bar or menu column may be created in place of (or in addition to) the display icon 36.

Figure 6:
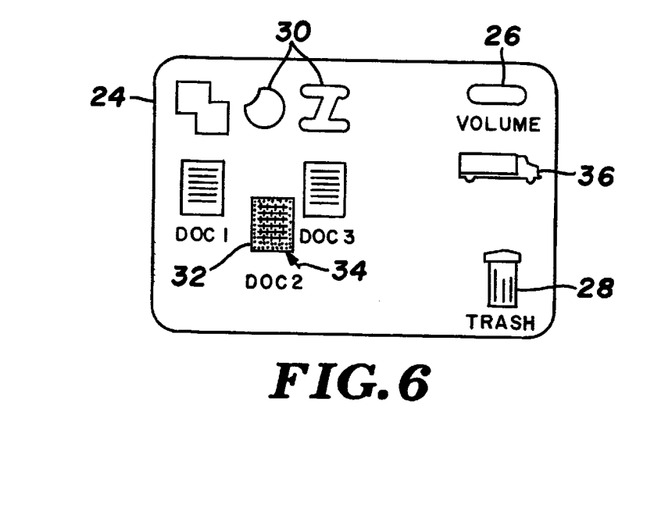
FIG. 6 is a diagrammatic depiction of the GUI of FIG. 5 wherein a document icon has been selected and is being dragged by the user.

FIG. 6 shows the sender 16 similarly using the pointing device 34 to select and highlight a document icon 32 corresponding to a document to be conveyed via the network to an intended recipient 16, and dragging that document icon 32 across the desktop 24.

Figure 7:
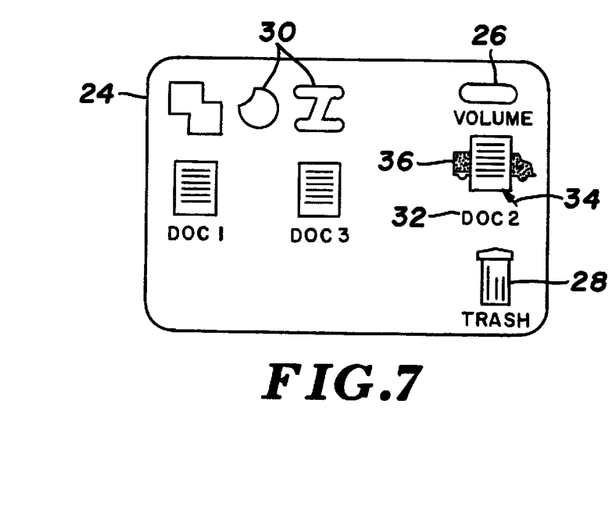
FIG. 7 diagrammatic depiction of the GUI of FIG. 6 wherein the document icon is being dropped in the screen icon.

In FIG. 7, the sender has dropped that document icon 32 into the display icon 34 corresponding to the service provider's program (and therefore the connection 18 to the network 10), and that icon is therefore shown as momentarily highlighted.

Figure 8:
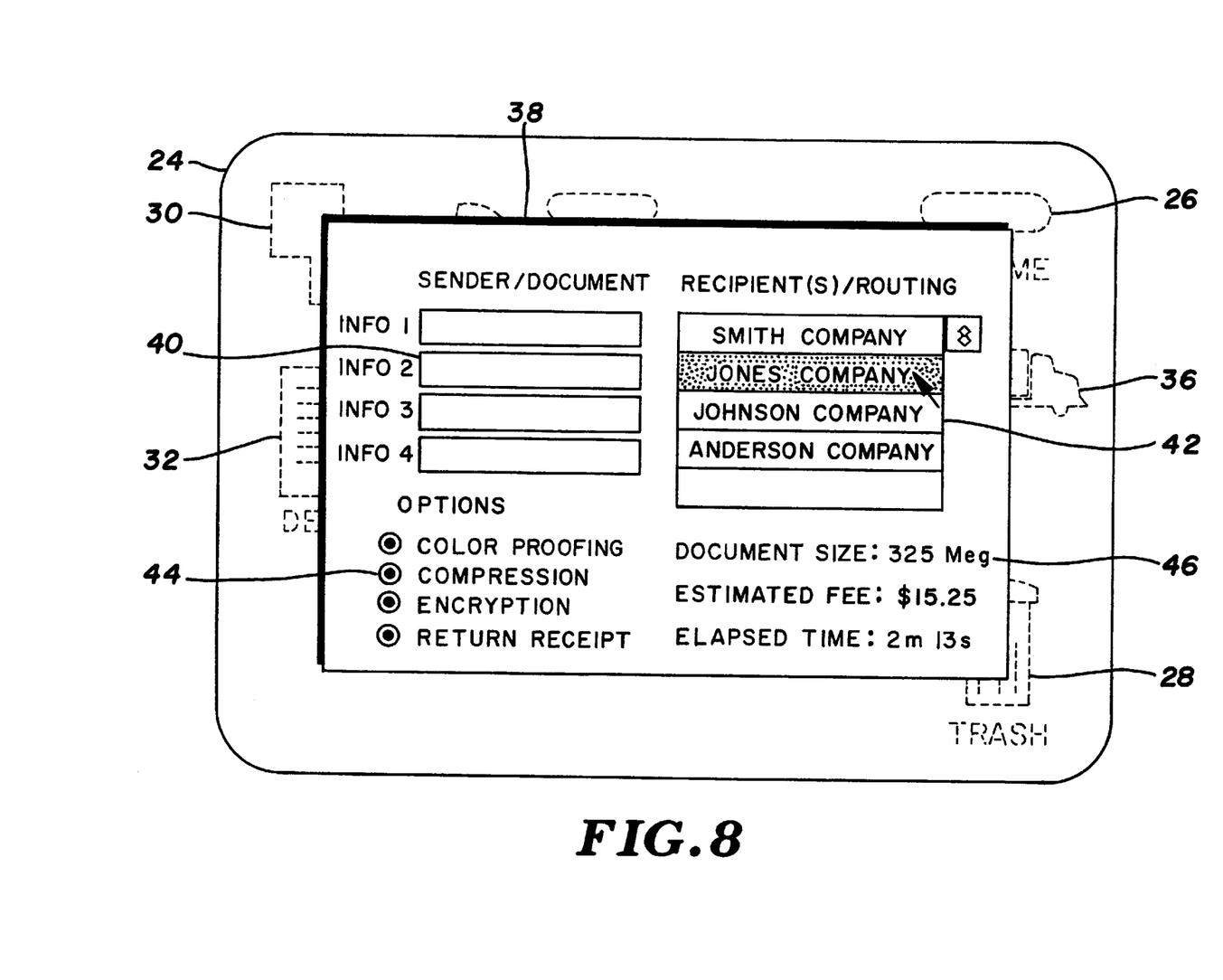
FIG. 8 is a diagrammatic depiction of the GUI of FIG. 7 wherein a dialog box has been opened and the user has input information and selected options, and the software program has provided responsive information.

As a result of this action, a dialog box 3 8 is generated on the desktop 24 a shown in FIG. 8. That dialog box 38 contains data entry fields 40 into which information regarding the document, sender or recipient 16, routing, or other criteria may be entered by the sender 16. The dialog box also contains selection fields 42 from which the sender may select one or more intended recipients based upon previously input information, or may enter pertinent information as needed or required. The dialog box 38 provides buttons 44 which may be selected or actuated in order to choose various options regarding the document information or content, its transmission, or the value-added services to be provided by the service provider. Actuation of those buttons 44 indicates selection of an option, and causes the software program to generate the appropriate commands or append the appropriate information to the document or the electronic invoice. Certain information generated by the software program (or transmitted from the service provider back to the sender's 16 computer system) may also be displayed within the dialog box 38, or retained in a separate log file. That displayed information may include the unique identification information for the document, such as a serial or tracking number, the document size in megabytes or other units, the expected transmission time required or estimated transmission time scheduled, confirmation of receipt, and so forth.

These various fields and the information provided or displayed will of course be designed for each particular embodiment or application of the network 10 depending upon the type of transmission and value-added services being provided, the nature of the service provider and the senders and recipients 16, the types of documents involved, and the capabilities of the sender's or recipient's software, hardware, and communications equipment, as well as being capable of further customization by the user within predefined parameters permitted by the software.

In this manner, an operative connection may be established with the service provider via the network access device 20 and communication pathway 18 by launching the service provider's program, and that program will then remain resident and available to the sender 16 in the "background" of the GUI throughout the day until later "quit," thus providing the sender 16 with the capability of quickly and easily transmitting documents a high transmission rates to any intended recipient 16 which is linked to the service provider's network 10, even at the most geographically-remote location and regardless of disparities between the sender's and recipient's 16 computer systems or local network protocols.

While the operation of the network 10 has been described from the perspective of a sender 16, it will operate in a similarly seamless and "invisible" manner to the recipient 16. The recipient 16 may be expecting delivery of a document, and will open the corresponding program screen or dialog box generated by the software program resident on the recipient's computer system, and determine whether that document has been received. Conversely, receipt of the document at the recipient's 16 computer system may produce a signal to the recipient 16, such as an e-mail message, an audible tone, the appearance of a visible icon or marker on the desktop or menu bar, or a flashing or blinking icon or symbol.

It may be readily appreciated that the software and network 10 may also be configured to permit a potential recipient 16 to issue a request to a particular network hub 12 or a sender's computer system, or a network-wide search request for a document satisfying given search criteria. Once identified, the location of that document could be provided to the potential recipient 16, who would then issue a request to the corresponding computer system or storage device on which the document resides, or the document could be automatically retrieved and transmitted to the recipient 16. Security and access protocols could restrict a recipient's access to searching only certain computer systems or network hubs 12, or permit the potential recipient 16 to only search for particular document types for which that person or computer system possesses authorization. Again, the level of technical complexity and the scope of available design alternatives will permit those of ordinary skill to develop embodiments of the network 10 to perform virtually any array of tasks that may be required, and meet the needs of an unlimited variety of users and industries.

While the preferred embodiments of the above method 10 have been described in detail with reference to the attached drawings Figures, it is understood that various changes and adaptations may be made in the method 10 without departing from the spirit and scope of the appended claims.

What is claimed is:

1. A method for conveying a document in an electronic domain from a sender via a service network to a recipient at a location geographically remote from the sender, comprising:

initiating a transmission by transporting a document from a sender to a primary hub of a service network, said primary hub being more geographically proximate to the sender than to a recipient;

associating an electronic invoice with the document, said electronic invoice containing: (i) document identification indicia uniquely identifying the document; and (ii) attribute indicia identifying a characteristic attribute related to a fee for transmission of the document to the receiver, wherein the fee is determinable, based on the attribute information, before the transmission is complete;

electronically transmitting the document on the service network from the primary hub to a secondary hub of the service network, said secondary hub located more geographically proximate to the recipient than to the sender;

transporting the document from the secondary hub to the recipient, thereby to complete the transmission; and using the attribute indicia of the electronic invoice to determine the fee based on said characteristic attribute.

2. The method of claim 1 further comprising:

creating a duplicate of the document in an electronic domain; and storing said duplicate in an archival storage system operatively associated with the primary hub of the service network.

3. The method of claim 2 further comprising the steps of:

creating a second duplicate of the document in the electronic domain; and storing said second duplicate in a second archival storage system operatively associated with the secondary hub of the service network.

4. The method of claim 1 further comprising the steps of:

creating a duplicate of the document in the electronic domain; and storing said duplicate in an archival storage system operatively associated with the secondary hub of the service network.

5. The method of claim 1 wherein the document contains digital data and the method further comprises:

performing a first processing operation on at least a portion of the digital data within the document using a processor first.

6. The method of claim 5 wherein the processing operation comprises at least one of the following: digital compression of the digital data encryption of the data, and color proofing of the data wherein the data comprises at least one graphic image.

7. The method of claim 6 wherein the method further comprises the step of:

performing a second processing operation on at least a portion of the digital data within the document, said second processing operation being performed by a second processor operation, said second processing operating comprising at least one of the following: decompression of the digital data compressed in the first processing operation.

8. The method of claim 5 further including:

verifying an integrity level of the data relative to a selected threshold subsequent to the step of electronically transmitting the document to the secondary hub; and retransmitting at least a portion of the document from the primary hub to the secondary hub responsive to determining that the integrity level is below the threshold.

9. The method of claim 1 wherein the step of transmitting the document from the primary hub to the secondary hub of the service network comprises the steps of:

dividing the document into a first subdocument and a second subdocument using a processor operatively associated with the primary hub of the service network, said first subdocument being electronically transmitted to the secondary hub of the service network;

electronically transmitting the second subdocument from the primary hub to a tertiary hub of the service network, said tertiary hub being located geographically remotely relative to both the primary hub and the secondary hub;

electronically transmitting the second subdocument from said tertiary hub to the secondary hub of the service network; and reassembling the first subdocument and the second subdocument to form the document transported to the recipient.

10. The method of claim 1 wherein the sender has a computer system and the step of transporting the document from the sender to the primary hub of the service network comprises:

providing an electronic transmission pathway between the computer system of the sender and the primary hub of the service network; and electronically transmitting the document over said electronic transmission pathway from the computer system of the sender to the primary hub of the service network.

11. The method of claim 10 wherein the computer system of the sender is operatively connected to a local area network having a first network protocol, and the electronic transmission pathway includes a dedicated network connection between said local area network of the sender and the primary hub of the service network, the service network having a second network protocol, said dedicated network connection including a network access device permitting electronic translation of the document between said first protocol and said second protocol.

12. The method of claim 10 wherein the electronic transmission pathway includes at least one of: a dedicated network connection between the computer system of the sender and the primary hub of the service network, an Internet connection, an ISDN line, and a microwave transmission system.

13. The method of claim 1 wherein at least a portion of the service network over which the document is electronically transmitted includes either a fiber optic transmission pathway or a satellite link.

14. The method of claim 1 wherein the sender has a computer system including a peripheral device for writing data to tangible media and the primary hub of the service network includes a peripheral device for reading data from tangible media, and further wherein the step of transporting the document from the sender to the primary hub of the service network comprises:

writing the document on a tangible medium;

physically transporting the tangible medium from the computer system of the sender to the peripheral device for reading data operatively connected to the primary hub of the service network; and reading the data from the tangible medium such that the document can be electronically transmitted via the service network.

15. The method of claim 1 wherein the recipient has a computer system and the step of transporting the document from the secondary hub of the service network to the recipient comprises:

providing an electronic transmission pathway between the computer system of the recipient and the secondary hub of the service network; and electronically transmitting the document over said electronic transmission pathway from the secondary hub of the service network to the computer system of the recipient.

16. The method of claim 15 wherein the computer system of the recipient is operatively connected to a local area network having a first network protocol, and the electronic transmission pathway includes a dedicated network connection between said local area network of the recipient and the secondary hub of the service network, the service network having a second network protocol, said dedicated network connection including a network access device permitting electronic translation of the document between said first protocol and said second protocol.

17. The method of claim 15 wherein the electronic transmission pathway includes at least one of: a dedicated network connection between the computer system of the recipient and the secondary hub of the service network, an Internet connection, an ISDN line, and a microwave transmission system.

18. The method of claim 1 wherein the recipient has a computer system including a peripheral device for reading data from tangible media and the secondary hub of the service network includes a peripheral device for writing data to tangible media, and further wherein the step of transporting the document from the secondary hub of the service network to the recipient comprises:

writing the document on a tangible medium;

physically transporting the tangible medium from the secondary hub to the peripheral device for reading data operatively connected to the computer system of the recipient; and reading the data from the tangible medium such that the document can be electronically manipulated by the computer system of the recipient.

19. The method of claim 1 wherein the service network has a maximum transmission rate and the sender has a computer system, and further wherein the step of transporting the document from the sender to the primary hub of the service network to the recipient comprises:

providing an electronic transmission pathway between the computer system of the sender and the primary hub of the service network, said electronic transmission pathway having a maximum transmission rate substantially less than the maximum transmission rate of the service network.

20. The method of claim 19 wherein the electronic transmission pathway includes a plurality of parallel connections, and wherein the document is divided into a plurality of subdocuments, each of said plurality of subdocuments being transmitted generally simultaneously with one another over a corresponding one of said plurality of parallel connections.

21. The method of claim 1 wherein the service network has a maximum transmission rate and the recipient has a computer system, and further wherein the step of transporting the document from the secondary hub of the service network to the recipient comprises:

providing an electronic transmission pathway between the computer system of the recipient and the secondary hub of the service network, said electronic transmission pathway having a maximum transmission rate substantially less than the maximum transmission rate of the service network.

22. The method of claim 21 wherein the electronic transmission pathway includes a plurality of parallel connections, and wherein the document is divided into a plurality of subdocuments, each of said plurality of subdocuments being transmitted generally simultaneously with one another over a corresponding one of said plurality of parallel connections.

23. The method of claim 1 wherein the unique identification indicia comprises a serial number associated with the document for tracking the document.

24. The method of claim 1 wherein the sender has a computer system and the unique identification indicia are generated by said computer system of the sender.

25. The method of claim 1 wherein the unique identification indicia are generated by the service provider.

26. The method of claim 1 wherein the characteristic attribute related to the fee for conveying the document from the sender to the recipient corresponds generally to at least one of: a byte size of the document, a transmission rate of the service network, a geographic separation between the primary hub and the secondary hub, a time of day at which the electronic transmission of the document from the primary hub to the secondary hub is performed, and a processing operation performed on the document by the service provider.

27. The method of claim 1 wherein the sender has a computer system and at least a portion of the information database for determining the fee resides on said computer system of the sender.

28. The method of claim 1 wherein the sender has a computer system operating under a graphic user interface capable of supporting drag-and-drop functions, and wherein the computer system includes software which operates on said graphic user interface and generates a display icon associated with the document, wherein the step of transporting the document from the sender to the primary hub is initiated by:

merging the document icon and the display icon by dragging and dropping the document icon within the display icon; and inputting identification information regarding the recipient to whom the operator intends to document to be transmitted.

29. The method of claim 1 wherein the document is conveyed to a plurality of additional recipients, and the service network includes a plurality of additional hubs operatively connected to the primary hub, each of said plurality of additional hubs being disposed generally geographically more proximate to a one of said plurality of additional recipients than to the sender, the method further comprising the steps of:

creating a number of duplicates of the document in the electronic domain equal to the plurality of additional recipients;

electronically transmitting a one of said duplicates of the document to a corresponding one of each of said plurality of additional hubs; and transporting each said one of said duplicates of the document from said corresponding one of said plurality of hubs to an associated one of the plurality of additional recipients.

30. The method of claim 1 wherein:

said characteristic attribute comprises an attribute of the document.

31. The method of claim 1 further comprising:

using the fee indicia to determine the fee prior to electronically transmitting the document from the primary hub to the secondary hub.

32. A data transmission network for conveying documents from senders to recipients at locations remote from one another, including:

a service network including a first hub at a first location, a second hub at a second location remote from the first location, and a first high speed transmission pathway coupled to the first hub and to the second hub for electronically transmitting documents in an electronic domain between the first and second hubs;

a first electronic data transmission path for connecting the first hub to a sending station relatively proximate the first hub and relatively remote from the second hub;

a second electronic data transmission path for connecting the second hub to a receiving station relatively proximate the second hub and relatively remote from the first hub; and a document-specific information generator in the service network, operative in response to providing a document from the sending station to the first hub for transmission to the receiving station via the second hub, for generating document-specific information including identification indicia that uniquely identify the document, and further for generating fee indicia responsive to a characteristic attribute related to a fee for transmitting the document from the sending station to the receiving station; and wherein said fee for transmitting the document is determinable, based on the fee indicia, before said transmission to the receiving station via the second hub.

33. The network of claim 32 wherein:

the document-specific information generator resides in the first hub.

34. The network of claim 32 wherein:

said service network further includes a first network interface device coupled along the first electronic data transmission path, and a second network interface device coupled along the second electronic data transmission path.

35. The network of claim 34 wherein:

said document-specific information generator resides at the first interface device.

36. The network of claim 32 further including:

a third network hub, a second high speed transmission pathway between the second hub and the third hub, and a third high speed transmission pathway between the first hub and the third hub;

means residing in the first hub for dividing the document into two separate subdocuments for parallel transmission from the first hub to the second hub via the first high speed pathway and via the second and third high speed pathways and the third hub, respectively; and means residing in the second hub for recombining the subdocuments.

37. The network of claim 32 wherein:

said first electronic data transmission path includes one of the following: a dedicated network connection between the first station and the first hub, an Internet connection, an ISDN line, and a microwave transmission system.

38. The network of claim 32 wherein:

said characteristic attribute related to a fee comprises a characteristic attribute of the document.

39. The network of claim 38 wherein:

said processor is adapted to calculate said fee before the transmission of the document to the receiving station via the second hub is initiated.

40. The network of claim 32 further including:

a processor for processing the fee indicia to calculate said fee based on the characteristic attribute.

41. A system for sending data to a remote location via a service network, including:

a service network including a first network hub, a second network hub geographically remote from the first network hub, and a high speed transmission pathway coupling the first hub and the second hub for electronic data transmission between the hubs;

a computer system having a graphic user interface, and a first electronic data transmission path for transmitting data between the computer system and the first hub;

at least one receiving station, and a second electronic data transmission path for transmitting data between each receiving station and the second hub;

wherein the computer system further incorporates software operating on the graphic user interface for generating icons including a document icon representing a document to be sent via the service network, and a display icon associated with software for establishing a communications connection of the computing system with the service network; and software for generating a plurality of data entry fields responsive to a dragging of the document icon into coincidence with the display icon, wherein the data entry fields are adapted to accept an input of information identifying the at least one receiving station coupled to said second geographically remote hub;

wherein said service network further includes a document-specific information generator, operative in response to the input of information into the data entry fields, for generating document-specific information including identification indicia that uniquely identify the document, and fee indicia generated responsive to a characteristic attribute related to a fee for transmitting the document, said fee being determinable based on the fee indicia before transmission of the document between the hubs.

* * * * *